(12) United States Patent
Van Der Schyf et al.

(10) Patent No.: US 10,830,420 B2
(45) Date of Patent: Nov. 10, 2020

(54) LUMINAIRE HAVING A CABLEWAY

(71) Applicants: Marthinus Christoffel Van Der Schyf, Austin, TX (US); Jonathan Becker Schmidt, Round Rock, TX (US); Kenneth B. Frame, Spring, TX (US)

(72) Inventors: Marthinus Christoffel Van Der Schyf, Austin, TX (US); Jonathan Becker Schmidt, Round Rock, TX (US); Kenneth B. Frame, Spring, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 0 days.

(21) Appl. No.: 16/523,589

(22) Filed: Jul. 26, 2019

(65) Prior Publication Data

US 2020/0041108 A1 Feb. 6, 2020

Related U.S. Application Data

(60) Provisional application No. 62/713,258, filed on Aug. 1, 2018.

(51) Int. Cl.
*H02G 11/00* (2006.01)
*A01G 9/24* (2006.01)
(Continued)

(52) U.S. Cl.
CPC .............. *F21V 21/14* (2013.01); *A01G 7/045* (2013.01); *A01G 9/249* (2019.05); *F21V 21/30* (2013.01);
(Continued)

(58) Field of Classification Search
CPC ........ F21V 21/14; F21V 21/30; F21V 23/002; F21V 23/02; F21V 21/16; F21V 21/18;
(Continued)

(56) References Cited

U.S. PATENT DOCUMENTS 5,595,441 A 1/1997 McGee
7,766,508 B2 * 8/2010 Villard .................... F21V 14/02
362/249.02

(Continued)

OTHER PUBLICATIONS

Press Release announced Aug. 28, 2018 entitled "Fluence Updates Spydr LED Lighting Solutions" by Fluence Bioengineering Inc. for luminaire marketed in US under trade name "Spydr 2 Series" including 1 photo and 3 text pages, available online at website https://fluence.science/spydr-2-series/ (visited Jul. 2019) (4 pgs., color).

*Primary Examiner* — Anabel Ton
(74) *Attorney, Agent, or Firm* — Edward S. Podszus (57) ABSTRACT

Systems and methods for collapsible lighting fixtures are disclosed. In aspects, a horticultural luminaire 100 has first and second light fixtures 110, 120 coupled in movable relation between storage and deployed positions by a coupling element 130 applying a retarding torque. Coupling element can be coupling shaft 250 providing friction, or friction hinge cartridge 260. In aspects, hinge 130 has ledge surfaces 218, 228 adjacent rotational hinge faces 216, 226 and extending transverse the rotational plane. In aspects, a horticultural luminaire has an articulated cableway extending through hinge 130 coupling light fixtures 110, 120 and guiding a cable entering from the exterior into cable passageways in light fixtures 110, 120, thereby lessening a cable pinch point during rotation and deployment.

20 Claims, 9 Drawing Sheets

(51) Int. Cl.
*F21V 21/14* (2006.01)
*F21V 23/00* (2015.01)
*F21V 23/02* (2006.01)
*A01G 7/04* (2006.01)
*F21V 21/30* (2006.01)
*F21Y 103/10* (2016.01)
*F21Y 115/10* (2016.01)
*F21Y 103/20* (2016.01)
*F21W 131/109* (2006.01)
*F21V 21/26* (2006.01)
*F21V 21/16* (2006.01)
*F21V 21/18* (2006.01)

(52) U.S. Cl.
CPC ............ *F21V 23/002* (2013.01); *F21V 23/02* (2013.01); *H02G 11/00* (2013.01); *F21V 21/16* (2013.01); *F21V 21/18* (2013.01); *F21V 21/26* (2013.01); *F21W 2131/109* (2013.01); *F21Y 2103/10* (2016.08); *F21Y 2103/20* (2016.08); *F21Y 2115/10* (2016.08)

(58) Field of Classification Search
CPC ......... F21V 21/26; A01G 9/249; A01G 7/045; H02G 11/00; F21Y 2103/10; F21Y 2103/20

See application file for complete search history.

(56) References Cited

U.S. PATENT DOCUMENTS

| | | |
|---|---|---|
| 8,875,348 B2 | 11/2014 | Kossett |
| 2005/0190551 A1 | 9/2005 | Rempel |
| 2008/0253121 A1 | 10/2008 | Chien |
| 2010/0083468 A1 | 4/2010 | Lin |
| 2010/0232147 A1 | 9/2010 | Bryant et al. |
| 2011/0019423 A1 | 1/2011 | Ko |
| 2012/0140473 A1* | 6/2012 | Chang .................... F21V 21/30 362/249.03 |
| 2012/0287671 A1 | 11/2012 | Parker et al. |
| 2016/0209015 A1 | 7/2016 | Mumma et al. |
| 2017/0307144 A1 | 10/2017 | Boomgaarden et al. |
| 2018/0087755 A1* | 3/2018 | Yorio .................... F21V 17/007 |
| 2018/0356048 A1 | 12/2018 | Duong et al. |
| 2018/0356077 A1 | 12/2018 | Duong et al. |
| 2019/0093867 A1 | 3/2019 | Qiu |
| 2019/0128533 A1* | 5/2019 | Bunzel .................. F24C 15/028 |
| 2020/0196536 A1* | 6/2020 | Pasini .................... A01G 7/045 |

\* cited by examiner

SECTION A-A
FIG. 9

SECTION B-B
FIG. 10

LUMINAIRE HAVING A CABLEWAY

FIELD OF THE DISCLOSURE

Examples of the present disclosure are related to systems and methods for collapsible lighting fixtures. More particularly, embodiments disclose lighting fixtures with hinge bodies that are configured to be positioned adjacent to each other, wherein a plane of rotation of the lighting fixtures is orthogonal to the positioning of light bars.

BACKGROUND

Controlled environment agriculture, especially vertical farming is becoming more prevalent in the US and around the world. Vertical farming relies on light fixtures to illuminate a plant canopy. The light fixtures uniformly distribute radiant flux over the plant canopy, while removing heat from light sources (typically LEDs). The light fixtures' efficacy and cost directly impacts the operational expenses associated with vertical farming. As fixture height directly influences a number of vertical layers within a growth volume, it is important to minimize a form factor or vertical height of the fixture.

Due to the large footprint of the light sources, it makes the light fixtures difficult to transport. Conventionally to transport light fixtures, light fixtures may be fully disassembled at a manufacturing plant and then re-assembled onsite. This creates extra and unnecessary steps to form the light fixture at a desired location. Additionally, the large footprint of the light source makes the light fixtures difficult to install, particularly by only one person. In many cases, two or more people are required to hang the light fixture in place because the light fixture is too unwieldy and awkward to manage by a single person.

Accordingly, needs exist for more effective and efficient systems and methods for foldable light fixtures systems, wherein hinge bodies are configured to be inserted into the rails of the light fixture and be positioned adjacent to each other while rotating the light fixture.

SUMMARY OF DISCLOSED EMBODIMENTS

Embodiments disclosed herein are directed towards a foldable light fixture, wherein a first fixture is coupled to a second fixture via hinge bodies positioned within rails of the first fixture and the second fixture. By rotating the first fixture and/or the second fixture about an axis defined by the hinge bodies, the light fixture may be folded over itself, such that the first fixture is positioned adjacent to the second fixture. This may allow the length of the light fixture to be reduced in half while in a transportation mode when compared to being in an operational mode. Embodiments may include a plurality of light fixtures, wherein each of the light fixtures can be independently collapsed or extended. This may allow for a system with a dynamic length based on a number of light fixtures that are expanded or collapsed.

Embodiments of the light fixture may include a first fixture, a second fixture, and hinges.

The first light fixture may be a light fixture that includes a first rail, a second rail, and light bars. The first rail and the second rail may be hollow rails and extend from a first end to a second end of the first fixture, wherein the hinges may be positioned on the second ends of the first rail and the second rail. The light bars may be configured to extend from the first rail to the second rail, wherein the light bars house lighting sources.

The second light fixture may be a light fixture that includes a third rail, a fourth rail, and light bars. The third and fourth rails may be hollow rails that extend from a first end to a second end of the second fixture, wherein the hinges may be positioned on the second ends of the third and fourth rails. The light bars may be configured to extend from the third rail to the second rail, wherein the light bars house lighting sources.

The hinges may be configured to be inserted into the rails to couple the first rail and the third rail, and the second rail and the fourth rail. Further, the hinges may provide for an axis of rotation between the first light fixture and the second light fixture, which may enable to light fixture to be folded over itself. The hinges may include a first portion and a second portion.

A first end of the first portion may be configured to be inserted into the first rail, and a first end of the second portion may be configured to be inserted into the third rail. Inner faces of the second ends of the first and third portions may be configured to be positioned adjacent to each other. A pivot may be inserted through the second ends of the first and third portions to couple the first portion and the second portion together, and to provide an axis of rotation of the light fixture. When the first light fixture and/or the second light fixture are rotating about the pivot, the inner faces of each other may remain adjacent to each other and remain in a plane orthogonal to an axis of rotation of the light figure.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION OF PREFERRED EMBODIMENTS

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Figure 1:
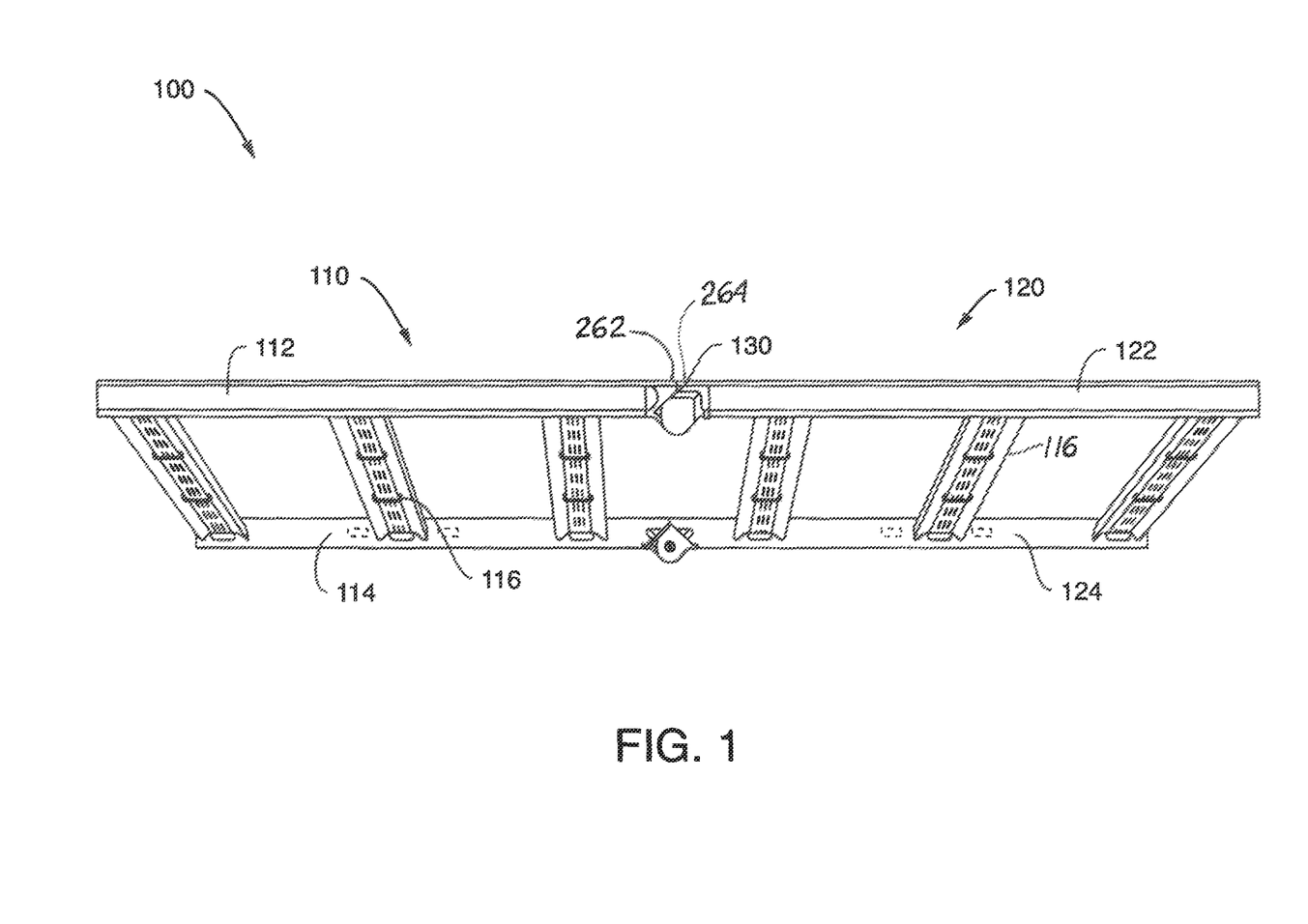
FIG. 1 shows lighting system 100 deployed in a mountable, operational, open first configuration, also referred to herein as expanded mode or fully extended.
Figure 4:
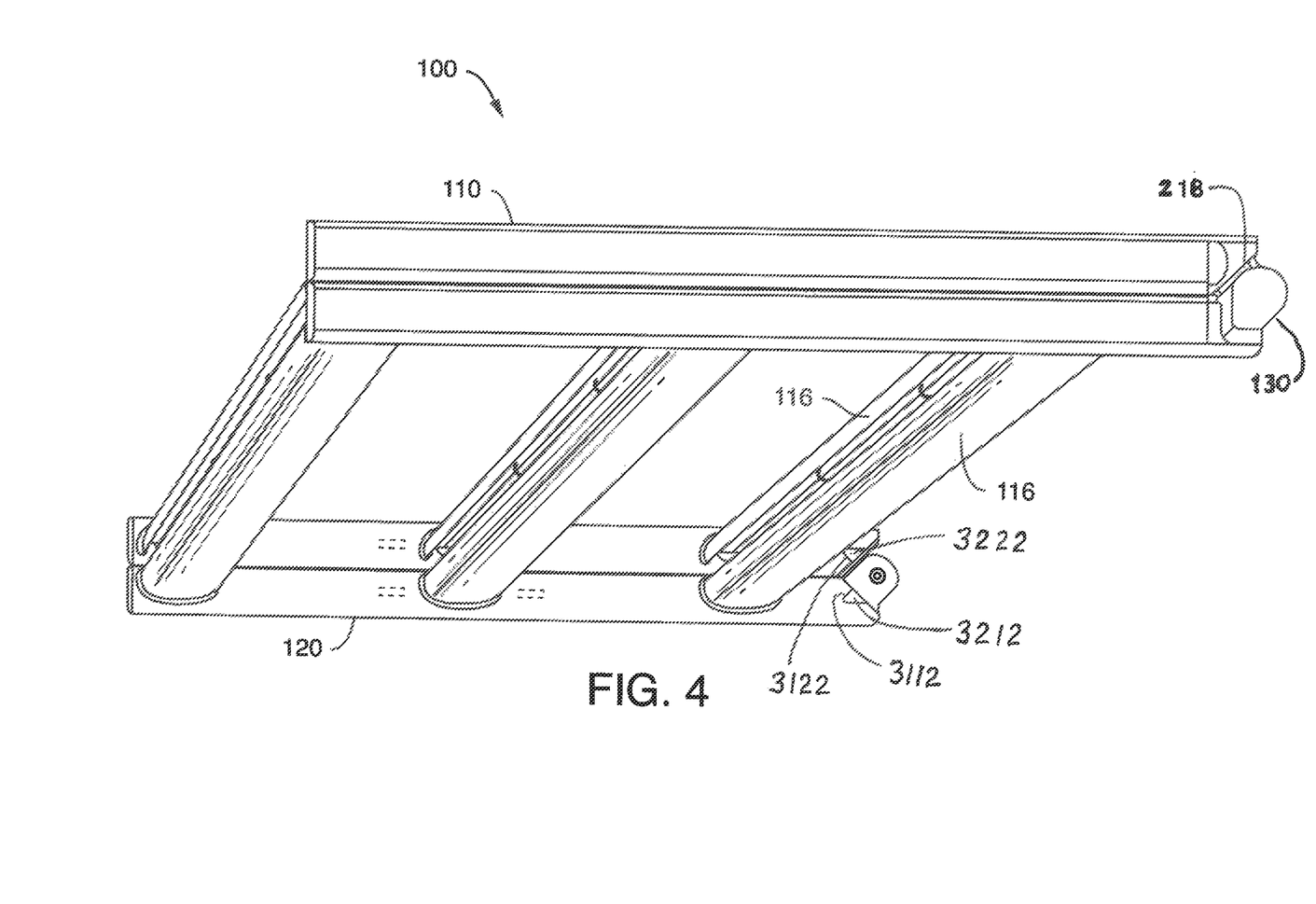
FIG. 4 is a perspective view of lighting system 100 in a second configuration that is closed, also referred to herein as folded mode or transportation mode for storage.

FIG. 1 depicts a lighting system 100, according to an embodiment. Lighting system 100 may be configured to fold in half via hinge 130. In a first mode, as shown in FIG. 1, the lighting system 100 may be fully extended. In a second mode, as shown in FIG. 4, lighting system 100 may be folded onto itself. Lighting system 100 may operate while in the first mode, enabling lighting system 100 to emit light over a longer area of interest. Lighting system 100 may be comprised of a first light fixture 110 and a second light fixture 120 that are coupled together via hinge 130. Utilizing hinge 130, first light fixture 110 and second light fixture 120 may be positioned in the same plane when expanded, and may be positioned in parallel planes when folded.

First light fixture 110 may include a first rail 112, second rail 114, and light bar 116.

First rail 112 and second rail 114 may be configured to extend from a first end of light fixture 110 to a second end of light fixture 110, wherein first rail 112 and second rail 114 may be in parallel to each other. Furthermore, the second ends of first rail 112 and second rail 114 may be coupled with hinge 130.

Light bars 116 may extend from first rail 112 to second rail 114, and be positioned perpendicular to first rail 112 and second rail 114. Light bars 116 may be configured to house lighting sources on a lower surface of light bar 116.

Second light fixture 120 may include a third rail 122, fourth rail 124, and light bars 116. Third rail 122 and fourth rail 124 may be configured to extend from a first end of second light fixture 120 to a second end of second light fixture 120, wherein third rail 122 and fourth rail 124 may be in parallel to each other. Furthermore, the second ends of third rail 122 and fourth rail 124 may be coupled with hinge 130.

Hinges 130 may be configured to couple first rail 112 and third rail 122, and second rail 114 and fourth rail 124. Further hinges 130 may be configured to be inserted into a hollow cavity within the rails, and also provide an axis of rotation for first light fixture 110 and/or second light fixture 120.

Figure 2:
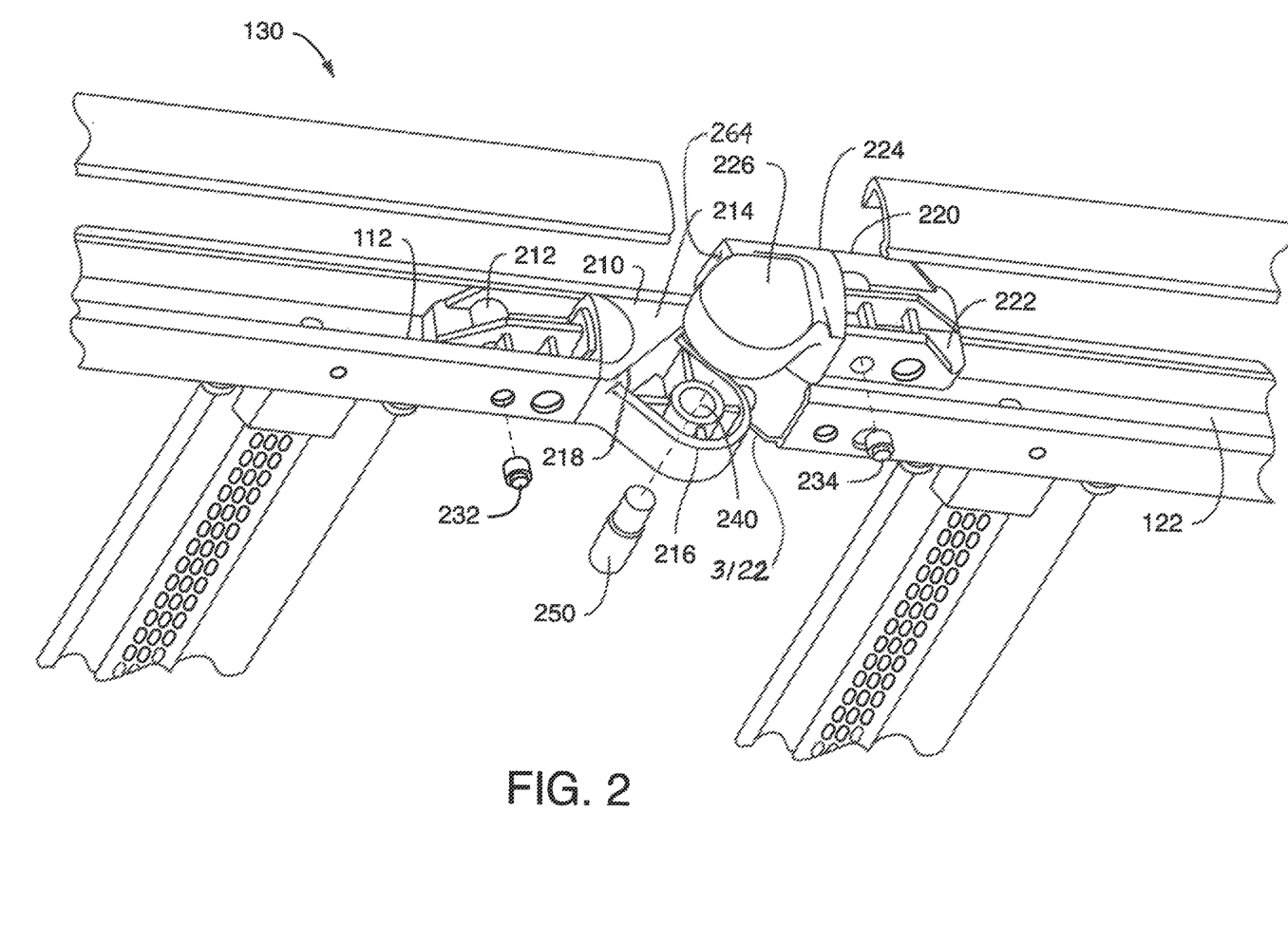
FIG. 2 is an exploded perspective view of a portion of lighting system 100, including components of hinge 130.

FIG. 2 depicts a detailed view of hinge 130, according to an embodiment. Elements depicted in FIG. 2 may be described above, and for the sake of brevity another description of these elements is omitted. Hinge 130 may be comprised of a first section 210 and a second section 220, wherein the different sections of hinge 130 may be configured to be inserted into corresponding rails on the same side of lighting system 100. In embodiments, first section 210 and second section 220 may be symmetrical parts.

First section 210 of hinge 130 may include a projection 212, body 214, and first hinge member 216.

Projection 212 may be a projection that is configured to be inserted and housed within a hollow chamber within a first rail. A lower surface of projection 212 may have a first coupling orifice that is configured to receive a first coupling member 232, which may be inserted through a lower surface of the first rail and into the lower surface of projection 212. Through first coupling member 232 the movement of first section 210 may be limited.

Body 214 may be configured to be positioned between projection 212 and first hinge member 216. Body 214 may have a lower surface that is configured to be positioned adjacent to and flush against a lower surface of the railing, and have an upper surface that is configured to be covered by an upper surface of the rail. Body 214 may have a width that is substantially the same as the rail.

First hinge member 216 may be configured to extend away from body 214 at an angle. First hinge member 216 may have a width that is smaller than that of body 214, such that an angled ledge 218 is formed on an inner surface of first member 216 on body 214. The ledge may allow the rotational plane of hinge 130 to be positioned with the width of body 214. Further, by ledge 218 being angled, when first hinge member 216 and/or second hinge member 226 rotates, ledge 218 will not obstruct the rotation.

An inner surface of first hinge member 216 may include a rotating member orifice 240, wherein rotating member orifice 240 is configured to receive a first end of coupling shaft 250.

Second section 220 of hinge 130 may include projection 222, body 224 and second hinge member 226.

Projection 222 may be a projection that is configured to be inserted and housed within a hollow chamber within a second rail. A lower surface of projection 212 may have a second coupling orifice that is configured to receive a second coupling member 234, which may be inserted through a lower surface of the second rail and into the lower surface of projection 222. Through second coupling member 234 the movement of first section 210 may be limited.

Body 224 may be configured to be positioned adjacent to projection and second hinge member 226. Body 224 may have a lower surface that is configured to be positioned adjacent to and flush against a lower surface of the second rail, and have an upper surface that is configured to be covered by an upper surface of the second rail. Body 224 may have a width that is substantially the same as the rail.

Second hinge member 226 may be configured to extend away from body 224 at an angle. Second hinge member 226 may have a width that is smaller than that of body 224, such that an angled ledge (228) is formed on an inner surface of second hinge member 226 on body 224. An inner surface of second hinge member 226 may include a second rotating member orifice (not shown), wherein the second rotating member orifice is configured to receive a second end of coupling shaft 250. Additionally, inner faces of first hinge member 216 and second hinge member 226 may be positioned adjacent to each other when first light fixture 110 is positioned adjacent to second light fixture 120 and when first light fixture 110 is positioned away from second light fixture 120. The positioning of the inner faces of first hinge member 216 and second hinge member 226 may create a rotational plane that is perpendicular to the positioning of the light bars and in parallel to a central axis of lighting system 100 when first light fixture 110 is positioned away from second light fixture 120. Further, by positioning the rotational plane between the inner faces of first hinge member 216 and second hinge member 226 the possibility of a pinch point hazard may be reduced.

Coupling shaft 250 may have a first end having a first diameter with a smooth circumference, and a second end having a second diameter with a circumference with ridges, bumps, etc. The first end may be configured to be pressed fit into first rotating member orifice 240, such that the first rail cannot move relative to the first end. The second end of coupling shaft 250 may be configured to be inserted into the second rotating member orifice. Due to the size differences between the second end of coupling shaft 250 and the first end of coupling shaft 250, the second rail may be configured to rotate around coupling shaft 250. This may enable the first light fixture and second light fixture be positioned apart or adjacent to each other. Furthermore, the grooves on the second end of coupling shaft 250 may cause friction against the second section 220 of hinge 130, this may assist in controlling the rotation of lighting system 100.

Figure 3:
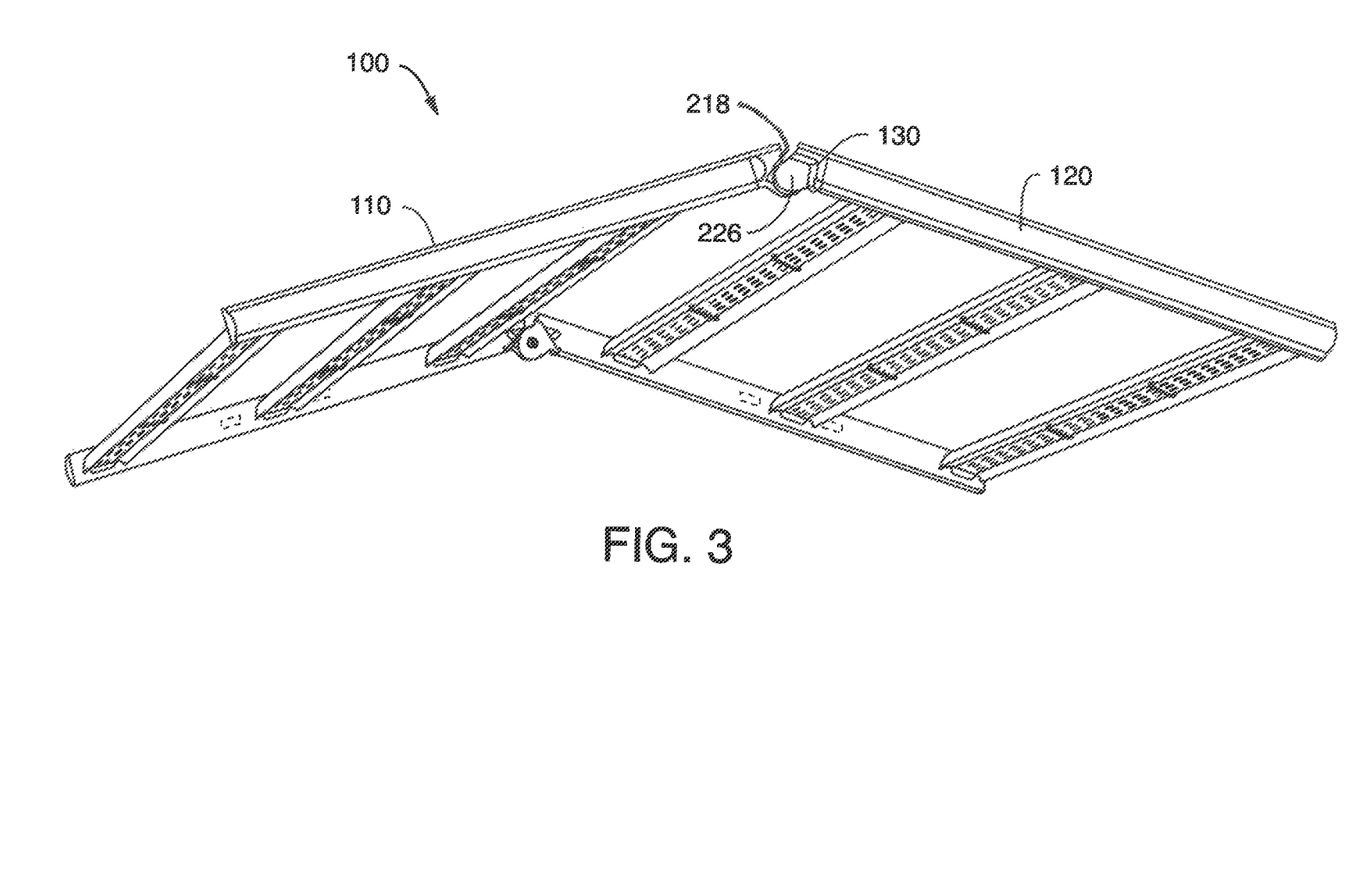
FIG. 3 is a perspective view of partially opened or expanded lighting system 100.

FIG. 3 depicts lighting system 100, according to an embodiment. Elements depicted in FIG. 3 may be described above, and for the sake of brevity another description of these elements is omitted.

As depicted in FIG. 3, first light fixture 110 and second light fixture 120 may be rotated relative to one another, which may decrease an angle between first light fixture 110 and second light fixture 120. As the light fixtures are rotated, ledge 218 may allow second hinge member 226 to rotate unobstructed.

FIG. 4 depicts lighting system 100, according to an embodiment. Elements depicted in FIG. 4 may be described above, and for the sake of brevity another description of these elements is omitted.

As depicted in FIG. 4, first light fixture 110 and second light fixture 120 may be rotated such that there is no angle or a minimal angle between the two light fixtures. When in the folded position, the light bars 116 may be aligned with each other. Furthermore, the lower surfaces of the light bars 116 may be positioned adjacent to each other. This may assist in protecting light sources positioned on the light bars 116.

Figure 5:
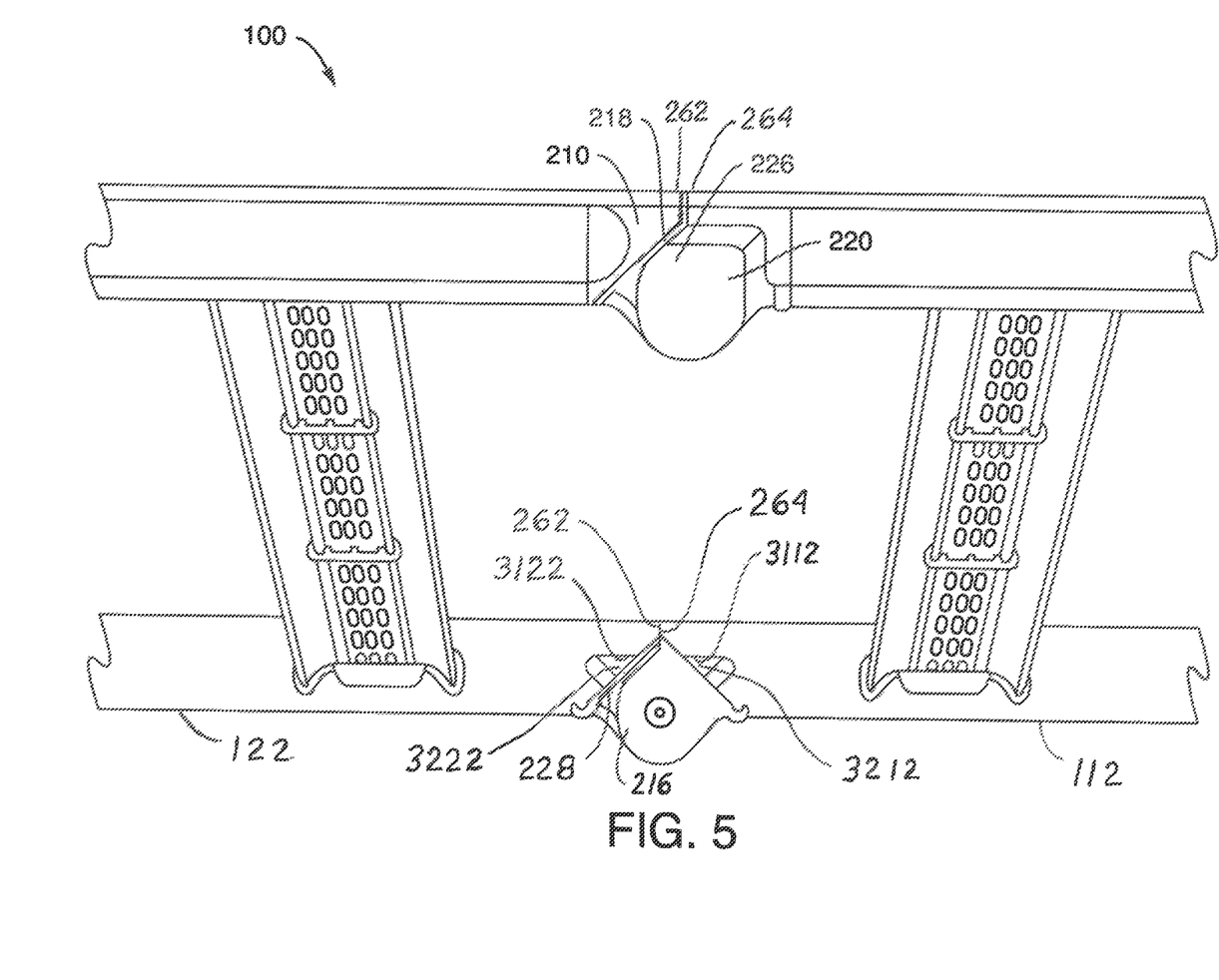
FIG. 5 is a perspective view of lighting system 100 in a first mode, fully extended.
Figure 6:
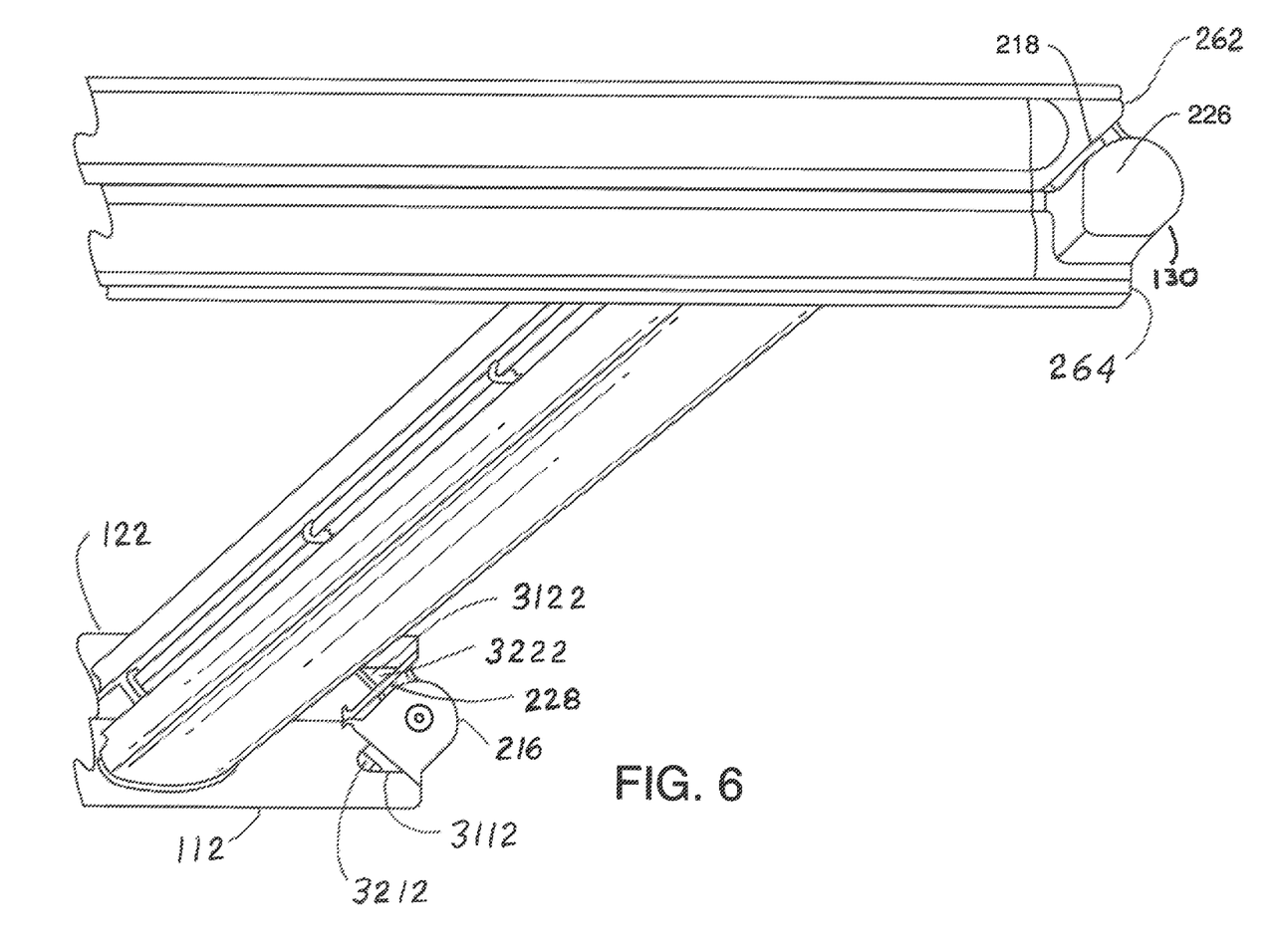
FIG. 6 is a perspective view of lighting system 100 in a second mode, closed.

FIG. 5 and FIG. 6 depict lighting system 100, according to an embodiment. Elements depicted in FIG. 5 and FIG. 6 may be described above, and for the sake of brevity another description of these elements is omitted.

As depicted in FIG. 5 and FIG. 6, when lighting system 100 is in an expanded mode or in the folded mode, ledge 218 may be positioned adjacent to a sidewall of second hinge member 226. By forming ledge 218 and the sidewalls of second hinge member 226 to have corresponding angles, the likelihood of a pinch point may be reduced.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

Lighting system 100 may also be referred to as luminaire 100. Each light fixture 110 and 120 carries light sources, preferably solid state light sources such as light-emitting diodes (LEDs). The light source is utilized to create light or supplement natural light to an area of interest. The light sources are preferably configured to stimulate plant growth, alone or in conjunction with natural light, by emitting a light spectrum that is similar to the sun, or to provide a spectrum that is tailored to the needs of particular plants being cultivated. In preferred embodiments light fixtures 110 and 120 collectively operate light sources, arranged for example on light bars 116, that dissipate 345 Watts, or more, of input power.

It is observed that in FIG. 2, FIG. 3, FIG. 5 or FIG. 6, ledge surface 218 (also called ledge 218) is positioned for clearance to rotating second hinge member 226 whether lighting system 100 is in the closed or open configuration. Ledge 218 is spaced from the lateral, confronting face of second hinge member 226 by about 3 mm, thus acting as a kind of partial enclosure or shroud preventing an ingress of a foreign object near the rotating face, and lessening a likelihood of a pinch point in that region. A similar clearance exists between second ledge surface 228 and the lateral confronting face of first hinge member 216, see e.g. FIG. 5, FIG. 6, FIG. 8, and as discussed hereinbelow, since the two principal hinge components are functionally symmetric. Furthermore, since as described above, first hinge member 216 has a width smaller than that of body 214, the rotational plane of hinge 130 is positioned within, that is, at or inside of, an envelope surface of the width of body 214. In preferred arrangements, the rotational plane of hinge 130 is within, i.e. at or inside of, an envelope surface of the channel formed in rail 112 into which projection 212 of first hinge body 214 is inserted. This permits a compact and aesthetically desirable joint. The projection 210, 222 may also be referred to as a tang. First hinge member 216 may also be referred to as a hinge face, and second hinge member 226 may also be referred to as a hinge face, since their confronting faces define the hinge rotational plane.

As discussed hereinabove referring to FIG. 2, coupling shaft 250 is configured to apply a predetermined or preselected retarding moment of force (or torque) during motion of first light fixture 110 relative to second light fixture 120. This retarding torque controls rotation of lighting system (or luminaire) 100 by the choice of the ridge, bumps or other friction-causing features relative to the size chosen for the orifice into which it is fitted. It may also be advantageous that coupling shaft 250 be embodied as a commercially available friction cartridge 260. An exemplary friction cartridge 260 is available under stock number TI-320-1.50-02 from Reell Precision Manufacturing Corp. (Minnesota, US) ("Reell"), which provides 1.5 Nm torque. The conventional manner of operation of such a friction cartridge is known and generally described in U.S. Pat. No. 8,875,348 (Kossett) assigned to Reell, in that a housing piece and an adapter piece are each firmly embedded in one of the respective two workpieces, e.g. here the first and second hinge members 216, 226; plural internal c-clip shaped torque elements are joined to the housing piece and bear frictionally on an internal axle that extends from the adapter piece and is fixed tightly by a spline to the adapter piece, thus enabling the commercially available friction cartridge to provide both axial and rotary resistance to relative motion between the two workpieces, here the two hinge faces 216, 226. Coupling shaft 250 or friction cartridge 260 advantageously permit a slow closing of the luminaire, with reduced likelihood of rapid closing that might otherwise surprise an operator or damage light bars 116.

A coupling element between first light fixture 110 and second light fixture 120 could be configured as a telescoping drawer slide mechanism (not illustrated) to permit translating relative motion with an appropriate spring and frictional engaging element providing retarding moment between the closed (second) mode and the deployed, operational, open (first) mode, but the relative rotary motion as illustrated herein is convenient. Hinge 130 advantageously provides such rotary motion. Luminaire 100 has in some embodiments a weight of about 24 pounds (11.2 kg) or more. Clearance dimensions for frictional coupling shaft 250, or specifications for the internal friction of a friction cartridge 260, are chosen to provide a predetermined retarding moment, e.g. torque, to allow for a slow closing of luminaire 100, thus tending to avoid pinching of fingers or entrapment of an electrical cable, which could more readily occur with the use of conventional simple surface mounted hinges, e.g. similar to door hinges or piano-style hinges that are mounted on a top or side surface otherwise connecting adjacent rails 112, 122. A conventional hinge would also disadvantageously permit rapid slamming of the luminaire halves closed, which due to the luminaire's weight might damage the luminaire or injure an operator. Furthermore, a conventional hinge coupled to an upper or side surface of a channel-shaped rail disadvantageously exposes, especially when the luminaire is in the folded closed position, the wireway and electrical connections inside the frame, which could lessen electrical safety.

A cableway is defined in some or all hollow rails 112, 114, 122, 124 to receive power cable 266 (see FIG. 12) extending from power supply module 270 through the cableway (also referred to as wireway) to light sources within individual light bars 116. For example referring to FIGS. 2, 4, and 5, rail 112 is formed with cable opening 3122, preferably on a lateral side wall or face transverse to a longitudinal axis of the rail. Likewise third rail 122 defines cable opening 3222, also on a lateral side. Such cable opening need not be surrounded by material, e.g. sheet metal, of the rail as a fully enclosed hole; as shown in the figures the aperture or orifice may be, as shown, an indentation in a peripheral wall, e.g. terminal edge, at the open cross-section that communicates with an interior cavity within the rail. An aperture, also referred to as hinge cableway aperture 3212, 3222, formed in each hinge body 214, 224 or projection 212, 222, respectively, provides access from a region exterior to luminaire 100 into the interior cavity (e.g. hollow channel) of a respective rail, see FIGS. 4, 5, 6, 12, and 13. Such apertures are preferably formed on a lateral inwardly facing wall (the lower portions of FIGS. 5, 6) of luminaire 100 rather than a more aesthetically prominent, outwardly directed wall (the upper portions of FIGS. 5, 6). Power received through cable 266 from power supply module 270 branches into each first and second light fixture 110, 120 through hinge 130. Due to rotational motion when moving from a closed (folded) to an open (deployed) position, a distance between these cableway openings 3212, 3222 varies, becoming a greater distance in the open (deployed) configuration. The opening formed in the hinge, and the manner in which the hinge plugs or occludes the rails, reduces or eliminates a likelihood of the cable becoming pinched or damaged during deployment of the luminaire from the closed to the open position. This arrangement is also likewise effective during storage when moving the luminaire from the open position to return to the closed position. This helps conform with electrical code requirements such as those of Underwriters Laboratory (UL).

Figure 12:
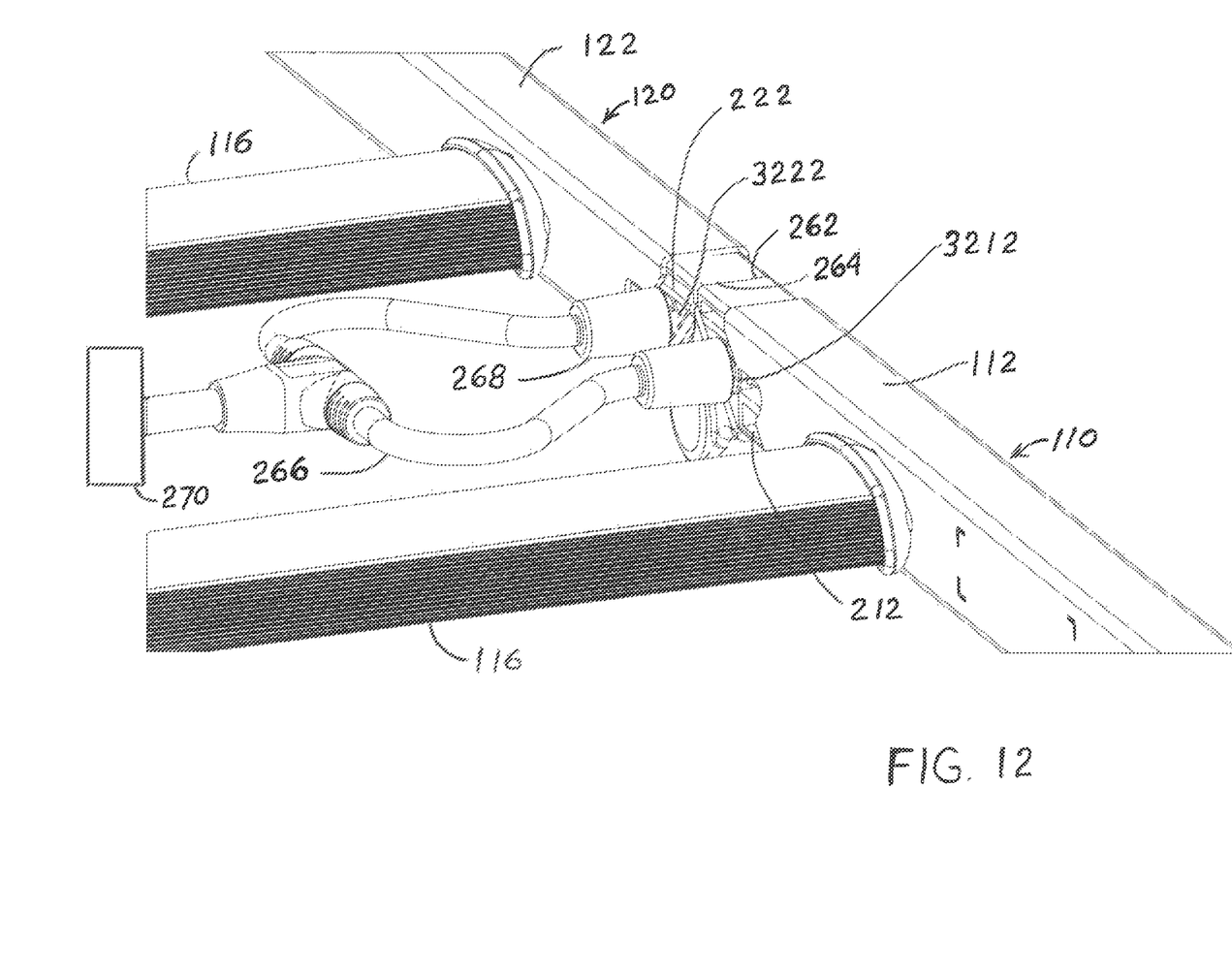
FIG. 12 shows power cable 266 entering both light fixtures through hinge 130.

FIG. 12 shows that cableway apertures 3212, 3222 formed in hinge bodies 214, 224, or respective hinge projections 212, 222, can support cable strain relief bosses 268 which are inserted therein and coupled to power supply cable 266.

FIGS. 5, 6, 8, and 13 show second ledge 228 formed on second hinge body 224 adjacent to second hinge member 226 and shaped to provide a spaced, shape-conforming clearance for depending first hinge member 216 throughout the relative motion occurring between the closed (or folded) position and the deployed or open position ("first mode"). The first hinge member 216 depends forwardly and downwardly from first body 214. The hinge bodies 214, 224 occupy the void existing at opposing longitudinal ends of each rail or frame member, concealing the wireway especially when the luminaire is in the collapsed condition, see FIG. 4 or FIG. 6. In exemplary embodiments, ledge 218 and ledge 228 conceal otherwise exposed ends of open channels of rails 112, 122 so that the cableway is concealed. This relationship is alternately expressed in that hinge 130 substantially occludes respective longitudinally oriented openings of the cavities, e.g. channels in rails 112, 122, that are facing hinge 130, e.g. mutually facing each other. A further alternate way of expressing this is that hinge body 130 is, along its longitudinal axis L (FIG. 7, FIG. 13) in register with a longitudinally oriented opening of the channel of a rail 112, 122, and the size of an inlet area communicating from a region exterior to the luminaire to the cable passageways does not get lessened or pinched but rather remains constant independent of an angular position between first and second light fixtures 110, 120. The region exterior to the luminaire refers to the general air space surrounding the luminaire's components, i.e. the space in which luminaire 100 is suspended for example from a ceiling in a greenhouse.

Figure 7:
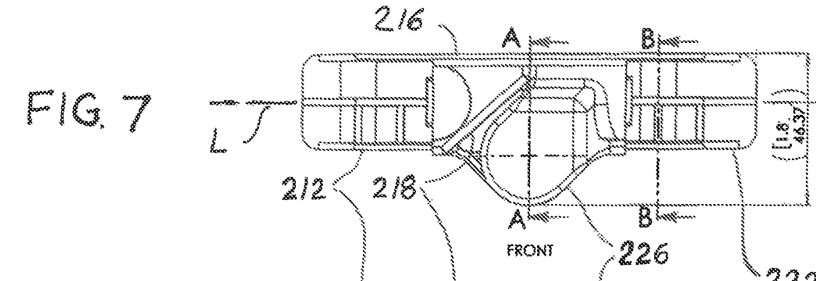
FIG. 7 is a front elevational view of hinge 130.
Figure 8:
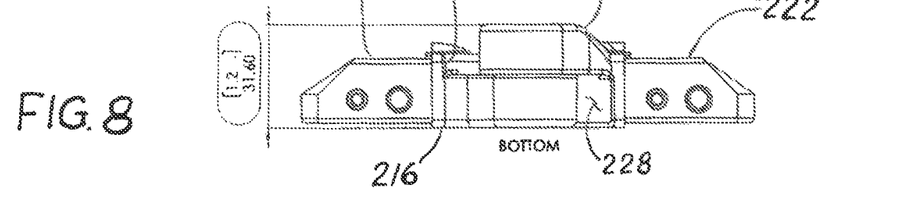
FIG. 8 is a bottom plan view of hinge 130.

FIG. 2 and FIG. 7 show a front surface of hinge 130 extending in a longitudinal direction, along axis L. A height of the hinge is advantageously compact, in an exemplary embodiment being being about 1.8 inch (circa 46.4 mm). FIG. 8 shows a bottom view of hinge 130 illustrating its width (W) in a lateral direction. FIG. 8 shows that ledge surface 228 and hinge member or hinge face 226 collectively occupy the lateral width. Analogously, ledge surface 218 and hinge member or hinge face 216 occupy the lateral width of hinge body 214. Ledge surface 228 helps prevent introduction of a foreign object into a region between rotating hinge members 216 and 226, thus helping avoid a pinch point in that region. A width of the lap joint hinge 130 is advantageously compact, in an exemplary embodiment being about 1.2 inch (circa 31.6 mm).

Figure 9:
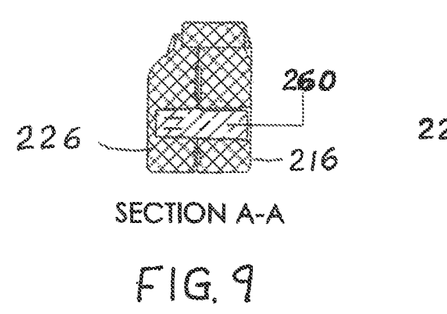
FIG. 9 is a cross-sectional view along A-A of FIG. 7 showing the friction cartridge.

FIG. 9 shows a cross-section A-A of FIG. 7 through hinge bodies 214, 224 and friction cartridge 260 firmly engaged, in a suitable orifice, in each of first hinge member 216 and second hinge member 226.

Figure 10:
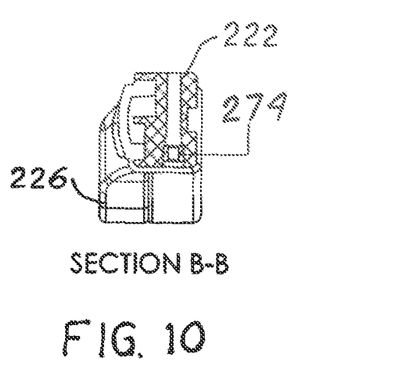
FIG. 10 is a cross-sectional view along B-B of FIG. 7 showing insert nut 274.

FIG. 10 shows a cross-section B-B of FIG. 7 through channel-receiving projection 222 of hinge second section 220, and further shows a threaded nut 274. Nut 274 may be overmolded into hinge section 220. The threaded nut 274 receives a fastener such as second coupling member 234 shown in exploded diagram of FIG. 2.

As shown in FIGS. 2, 5, 6 12, and 13, a suitable limit on angular rotation of hinge 130 is provided by abutment surface 262 formed on first hinge body 214 and cooperating stop surface 264 formed on second hinge body 224. The first light fixture 110 and second light fixture 120 face each other in the first, closed position (which may also be referred to as "a second mode") for storage or transport. In this first position light-emitting surfaces of light bars 116 of first light fixture 110 face the light-emitting surface of light bars 116 of second light fixture 120. That is, in the first position of storage, first and second light fixtures 110, 120 are in parallel planes, slightly offset, and their respective light-emitting surfaces are in confronting relation. In the second, open position (which may also be referred to as "a first mode") luminaire 100 is deployed for use, and in embodiments first light fixture 110 has rotated about 180 degrees into approximately the same plane as that of light fixture 120. As shown in FIG. 5, abutment surface 262 confronts stop surface 264. In other embodiments hinge 130 limits angular displacement of light fixture 110 to not more than about 180 degrees.

Figure 13:
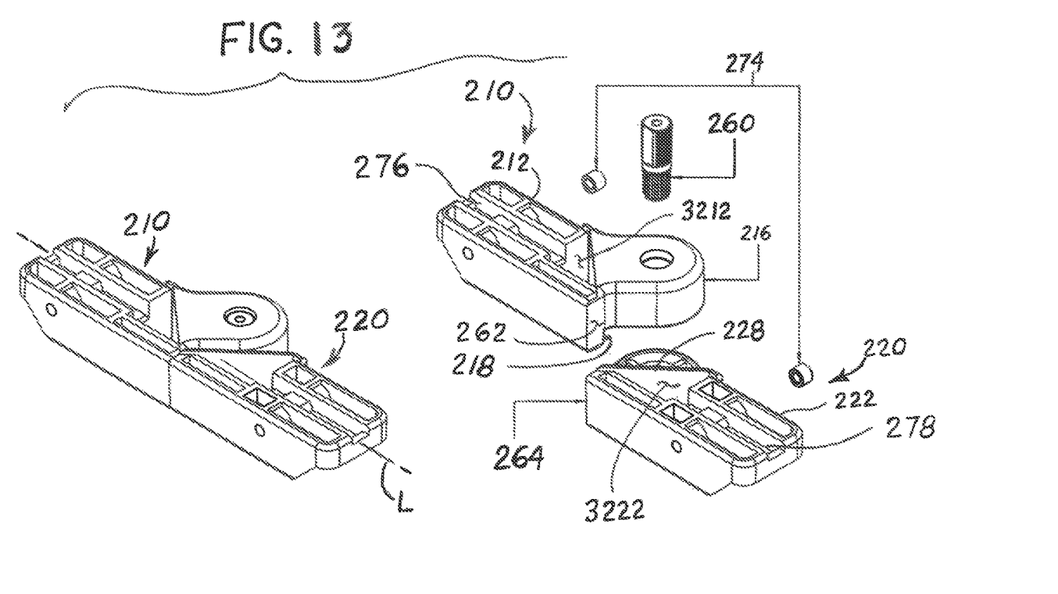
FIG. 13 is a rear perspective and exploded rear perspective view of hinge 130.

FIG. 13 shows a rear perspective view including a rear exploded perspective view of hinge 130. The first hinge cableway aperture 3212 on hinge projection 212 communicates with a groove or channel formed on hinge body 214 and projection 212 defining first cableway 276 extending along hinge projection 212. The second hinge cableway aperture 3222 on hinge projection 222 communicates with a groove or channel formed on hinge body 224 and projection 222 defining second cableway 276 extending along hinge projection 222. In an assembled condition as shown in FIG. 2, FIG. 5, or FIG. 12, it is evident that these two cableways 274, 276 communicate between, on the one hand, the interior cavities or hollow channels in the rails, which create a passageway to guide a power cable to light bars 1116, and on the other hand, an exterior region exterior of luminaire 100 where power supply module 270 is located, as shown in FIG. 11 or FIG. 12.

Hinge body occludes the channel, advantageous in a horticultural luminaire so that moisture or dirt have lesser tendency to enter the channel of the rail.

Figure 11:
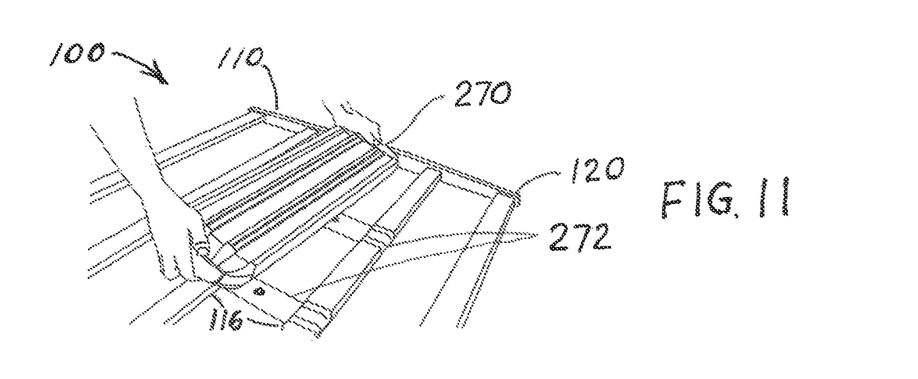
FIG. 11 shows luminaire 100 latched open by brackets 272 with power supply module 270 attached to brackets 272.

In operation, and referring to FIG. 11, after an operator opens light fixture 110 relative to light fixture 120, then one or more braces or brackets 272 are positioned on the frame of luminaire 100 to latch it open. Brackets 272 could extend across and interconnect one or more rails of one light fixture to one or more rails of the other light fixture. Advantageously, brackets 272 extend across a centrally located light bar 116 of each of the two light fixtures, and act as a latch that resists further relative motion, e.g. further rotation, between the light fixtures. This thus secures the orientation of the deployed, second position. The power supply module 270 is conveniently attached to quick-connect features on brackets 272.

Further details with regard to various considerations concerning the design of hinged, folding lighting fixtures may be found in United States Patent Application Publications US2018/0356048 (Duong) and US2018/0356077 (Duong), the entire contents of each of which is incorporated herein by reference as if fully set forth herein, each of which published Dec. 13, 2018, entitled "Systems and Methods for Lighting Fixtures" and is assigned to the assignee of the present application. Reference is also made to a press release dated Aug. 28, 2018 (available online at https://fluence.science/spyder-2-series/as of July, 2019) by the present assignee announcing the lighting system marketed under the trade designation "Spyder-2" series similar to the luminaire depicted in the FIGS. 1-13 herein, including as in FIGS. 7-13. These two published patent applications and the press release of Aug. 28, 2018 are cited for the purpose of reference and further detail only, and is not an indication or admission that any of them qualify as prior art.

Known lamps having hinges are shown in U.S. Pat. No. 7,766,508 (Villard); U.S. Pat. No. 5,595,441 (McGee); and Patent Publications US2008/0253121 (Chien) and US2017/0307144 (Boomgaarden).

The following non-limiting reference numerals are used in the specification:
100 lighting system or luminaire
110 first light fixture
112 first rail of first light fixture 110
114 second rail of first light fixture 110
116 light bar
120 second light fixture
122 third rail (of second light fixture 120)
124 fourth rail (of second light fixture 120)
130 hinge
210 first section of hinge 130
212 projection of hinge first section 210
214 body of hinge first section 210
216 first hinge member of hinge first section 210
218 angled ledge of first hinge member 216
220 second section of hinge 130
222 projection of hinge second section 220
224 body of hinge second section 220
226 second hinge member of hinge second section 220
228 second angled ledge (of hinge body 224) section
232 first coupling member (fastener, e.g. bolt)
234 second coupling member (fastener, e.g. bolt)
240 first rotating member orifice
250 friction coupling shaft
260 friction cartridge
262 abutment surface
264 stop surface
266 power cable 268 cable strain relief
270 power supply module
272 bracket (power supply-mounting light bar bracket)
274 threaded nut
276 cableway in first hinge projection 212
278 cableway in second hinge projection 222
3112 cable opening in first rail 112
3122 cable opening in second rail 122
3212 first hinge cableway aperture in first hinge projection 212
3222 second hinge cableway aperture in second hinge projection 222
L longitudinal axis of hinge projection member (see FIG. 7, FIG. 13)

What is claimed is:

1. A horticultural luminaire having an internal articulated cableway, comprising:
   a first light fixture (110) coupled by a hinge (130) for rotational motion relative a second light fixture (120);
   the first light fixture comprising a first rail (112) having an interior cavity defining a cable passageway to which a first light source is coupled,
   the second light fixture comprising a second rail (122) having an interior cavity defining a cable passageway to which a second light source is coupled;
   the first rail (112) defining a first cable opening (3112) adjacent the hinge;
   the second rail (122) defining a second cable opening (3222) adjacent the hinge;
   wherein the hinge has a hinge body (214, 224) defining first and second hinge projections (212; 222) receiving respective first and second rails,
   the first hinge projection (212) defines a first cableway aperture (3212) in register with the first rail cable opening (3112);
   the second hinge projection (222) defines a second cableway aperture (3222) in register with the second rail cable opening (3222);
   whereby the first and second hinge cableway apertures define a path in which a power cable is receivable communicating from a region exterior of the hinge to the interior cavities of both the first and the second rails.

2. The horticultural luminaire of claim 1, wherein the hinge body substantially occludes a longitudinally oriented opening of the cavity; and the first cable opening is formed in a lateral side of the first rail facing generally transverse a longitudinal axis of the cable passageway.

3. The horticultural luminaire of claim 1, wherein the hinge body is in register with a longitudinally oriented opening of the cavity; and a size of inlet area communicating from a region exterior to the luminaire to the cable passageways remains constant independent of an angular position between the first and the second light fixtures.

4. The horticultural luminaire of claim 1, wherein
   the hinge comprises a first hinge section (210) and a second hinge section (220),
   the first hinge section (210) further comprising a first ledge surface (218) formed on a lateral surface thereof in confronting relation to the cable passageway in the first rail.

5. The horticultural luminaire of claim 4, wherein the first ledge surface substantially occupies a cross-sectional area of the interior cavity of the first rail, thereby reducing likelihood of a pinch point during hinge rotation.

6. The horticultural luminaire of claim 1, wherein the first and second hinge projections (212; 222) are received in respective first and second rails.

7. The horticultural luminaire of claim 6, wherein the first and second hinge projections (212; 222) extend into respective first and second rails a distance at least equal to a width of the rail interior cavity.

8. The horticultural luminaire of claim 1, wherein a distance between the first and second cableway apertures varies dependent on an angular position between the first and the second light fixtures.

9. The horticultural luminaire of claim 1, wherein a power supply cable (266) is disposed within the cable passageways in the first and second rails electrically coupled to the first and second light sources, the power supply cable extending through the respective first and second cableway apertures on the hinge body.

10. The horticultural luminaire of claim 9, further comprising a cable strain relief (268) received in the cableway aperture of at least one of the first and second hinge projections and extending to an exterior region of the luminaire, wherein the cable strain relief is coupled to the power supply cable (266).

11. The horticultural luminaire of claim 1, wherein a cableway (276; 278) is formed on at least one of the first and second hinge projections (212; 222), the cableway in communication with the cable passageway defined in the respective rail and the cableway aperture defined in the respective hinge projection.

12. The horticultural luminaire of claim 1, wherein each of the first and second light fixtures comprise a plurality of light sources (160).

13. The horticultural luminaire of claim 1, wherein the cableway apertures are aligned with a rotational axis of the hinge.

14. A horticultural luminaire having an internal articulated cableway, comprising:
   a first light fixture (110) coupled by a hinge (130) for rotational motion relative a second light fixture (120),
   each of the light fixtures having
   a cavity (112; 122) defining a cable passageway configured to receive a cable; and
   a cable opening (3112; 3122) adjacent the hinge;
   the hinge further defining a respective cableway aperture (3212; 3222) aligned with a respective one of the cable openings (3112; 3122) in the light fixtures,
   whereby irrespective of an angular position between the light fixtures, an ingress pathway from a region exterior the luminaire to the cable passageways of the light fixtures remains substantially unobstructed.

15. The horticultural luminaire of claim 14, wherein the cableway apertures are aligned with a rotational axis of the hinge.

16. The horticultural luminaire of claim 14, wherein the hinge substantially occludes respective longitudinally oriented openings of the cavities that are facing the hinge; and the respective cable openings are formed in a lateral side of the light fixture facing generally transverse a longitudinal axis of the cable passageways.

17. The horticultural luminaire of claim 14, wherein the hinge is in register with the longitudinally oriented openings of the cavities that are in confronting relationship to one another; and a size of inlet area communicating from a region exterior to the luminaire to the cable passageways remains constant independent of an angular position between the first and the second light fixtures.

18. The horticultural luminaire of claim 14, wherein a power supply cable (266) is disposed at least partially within at least one of the first and second cable passageways and electrically coupled to a light source (116) disposed on at least one of the first and second light fixtures, the power supply cable extending through the respective cableway aperture (3212; 3222) on the hinge body.

19. The horticultural luminaire of claim 18, further comprising a cable strain relief (268) received in the respective cableway aperture of at least one of the first and second hinge projections and extending to an exterior region of the luminaire, wherein the cable strain relief is coupled to the power supply cable (266).

20. The horticultural luminaire of claim 14, in combination with a power supply module (270) disposed in the region exterior the luminaire and electrically coupled thereto.

* * * * *